E. A. GUTERMANN.
PERCOLATOR OVERFLOW.
APPLICATION FILED AUG. 3, 1909.
945,938.
Patented Jan. 11, 1910.
2 SHEETS—SHEET 2.
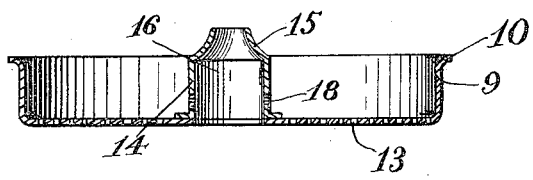
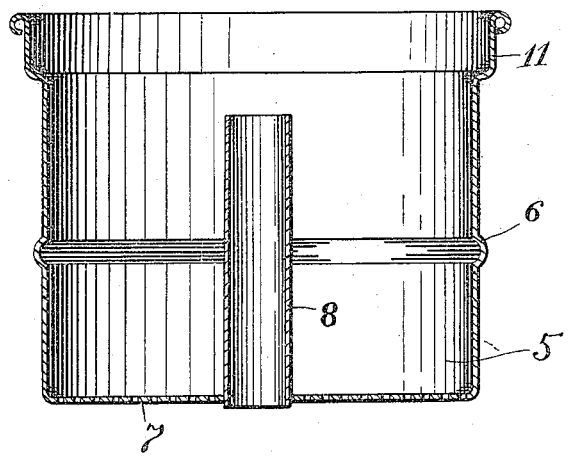

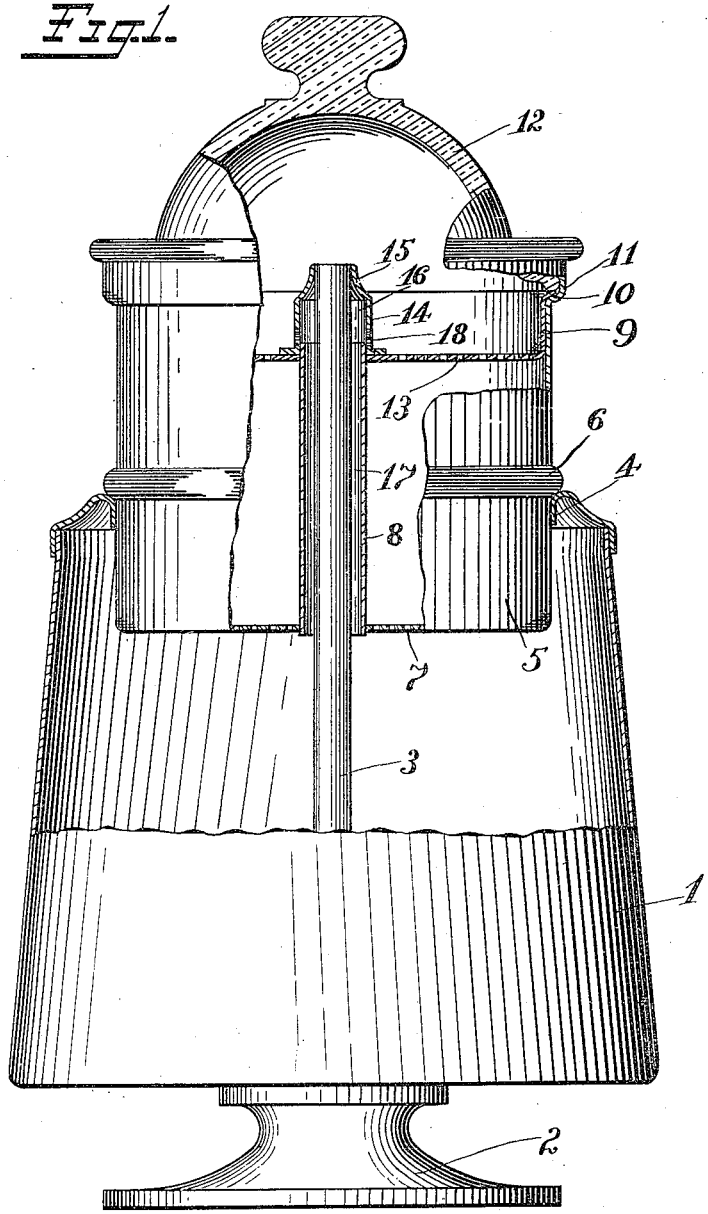

UNITED STATES PATENT OFFICE.

EDWARD A. GUTERMANN, OF MERIDEN, CONNECTICUT, ASSIGNOR TO MANNING BOWMAN AND COMPANY, OF MERIDEN, CONNECTICUT, A CORPORATION OF CONNECTICUT.

PERCOLATOR-OVERFLOW.

945,938.  Specification of Letters Patent.  Patented Jan. 11, 1910.

Application filed August 3, 1909. Serial No. 510,962.

*To all whom it may concern:*

Be it known that I, EDWARD A. GUTERMANN, a citizen of the United States, residing at Meriden, county of New Haven, State of Connecticut, have invented certain new and useful Improvements in Percolator-Overflows, of which the following is a full, clear, and exact description.

My invention relates to improvements in so-called percolator coffee pots and is concerned particularly with the provision of an overflow for surplus liquid in the coffee container. Percolators of this description comprise usually in their construction a coffee container which is fitted into the top of the coffee pot, or main vessel, and a so-called coffee retainer, which is fitted into the top of the container and is provided with a perforated bottom which overlies the coffee, and which also serves to distribute the percolated liquid from the percolating tube thoroughly over all parts of the coffee. Should the percolating operation become so rapid as to cause a surplus of liquid to collect in the retainer, provision must be made for conducting this liquid back into the main vessel in order to prevent overflow to the outside of the pot.

With this end in view, my invention consists in the construction and arrangement of parts, a preferred embodiment of which is illustrated in the accompanying drawings, in which, Figure 1 is an elevation partly in section of a percolating coffee pot embodying my invention; Fig. 2 is a sectional view of the coffee retainer detached; and, Fig. 3 is a view similar to Fig. 2 of the coffee container.

The embodiment of the invention herein selected for illustration comprises the pot or main vessel 1, having secured to the bottom thereof any desired form of heating chamber 2, into which, or over which, fits the usual percolating tube 3. Within the mouth 4 of the pot or main vessel is fitted a coffee container 5 having an annular shoulder 6 to determine the extent of projection of the container into the main pot. The said container is provided with a perforated bottom 7, to which is secured an upwardly projecting sleeve 8, through which the percolating tube 3 projects when the parts are assembled. As will be seen from an inspection of Fig. 1, the sleeve 8 terminates at some considerable distance below the upper end of the percolating tube 3.

Within the container 5 is fitted a coffee retainer 9 having an outwardly projecting flange 10 which rests upon an annular shoulder 11 in the upper part of the container 5. The usual cover 12 of glass or other suitable material may be fitted into the upper end of the container and rests upon the flange 10 of the retainer.

The coffee retainer is provided with a perforated bottom 13 having a central aperture adjacent which is secured a tubular projection 14 having a diameter sufficient to fit snugly over and around the upper end of the sleeve 8, and having its upper end contracted at 15 to fit snugly against the upper end of the percolating tube 3. By this construction an annular chamber 16 is provided between the tubular portion 14 and the percolating tube, which chamber forms a continuation of a similar annular chamber 17 between the sleeve 8 and the percolating tube 3 leading down into the main body of the pot. The tubular member 14 is provided with a plurality of perforations 18 affording communication between the retainer and the annular chamber 16, whereby surplus liquid in the retainer may escape into the annular chamber 16 and thence through the annular chamber 17 back into the main body of the pot. The perforations in the retainer are made sufficiently small to prevent the escape of any of the coffee grounds to the upper side of the retainer, whereby none of the grounds will be carried into the main body or pot with the back-flow of the surplus liquid from the retainer. Furthermore, the contraction at 15 of the tubular part 14 will serve to center and securely hold the percolating tube in proper position within the sleeve 8.

While I have herein described the particular embodiment of my invention, it should be understood that the same may be varied in detail and in arrangement of parts without departing from the spirit and scope thereof.

What I claim is:

1. A percolator pot comprising a main pot having a heating chamber at the bottom thereof, a percolating tube extending from said chamber, a coffee container, fitting into said pot, through which said tube projects, a sleeve secured to the bottom of said container forming a passage adjacent said tube, a coffee retainer fitted into said container and having a tubular portion secured to the bottom thereof adapted to fit over the upper end of said sleeve and to form a passage adjacent said tube, said tubular portion having openings affording communication between said retainer and through said passages with the main pot.

2. A percolator pot comprising a main pot having a heating chamber at the bottom thereof, a percolating tube extending from said chamber, a coffee container fitted into said pot through which said tube is arranged to project, a sleeve mounted on the base of said container and forming a passage adjacent said tube, a coffee retainer adapted to fit within said container and overlie the coffee therein, and having a perforated bottom, a tubular portion secured to the bottom of said retainer and adapted to fit over the upper end of said sleeve and to form a passage adjacent said tube communicating with the chamber between said tube and sleeve, said tubular portion having openings affording communication between said container and through said passages adjacent the tube with the main body of the pot.

3. A percolator pot comprising a main pot having a heating chamber at the bottom thereof, a percolating tube projecting from said chamber, a coffee container fitted into said pot and through which said tube projects, a sleeve mounted on the base of said container and forming a passage adjacent said tube, a retainer fitted into said container and adapted to overlie the coffee and having a perforated base, a tubular member on the base of said retainer adapted to fit over the upper end of said sleeve and to form a passage adjacent the upper end of said tube, the upper end of said tubular portion constructed to fit closely around said tube to center and hold the same in proper position within said sleeve, said tubular portion having openings to afford communication between said retainer and through said passage adjacent the tube with said main pot.

4. A percolator pot comprising a main pot having a heating chamber at the bottom thereof, a percolating tube extending upwardly from said chamber, a coffee container adapted to fit within said pot through which said tube projects, a sleeve mounted on the base of said container and forming a passage adjacent said tube, a coffee retainer adapted to fit within said container and having a perforated base arranged to overlie the coffee, a tubular member mounted upon the base of said retainer and adapted to fit snugly about the upper end of said sleeve and forming a passage adjacent said tube, the upper end of said tubular member being contracted to fit snugly around the upper end of said tube, said tubular member having a plurality of perforations adjacent the base of said retainer affording communication between said retainer and through said passages with said main pot.

EDWARD A. GUTERMANN.

Witnesses:
A. L. STETSON,
JOHN R. DAVIS.